(12) United States Patent
Chari et al.

(10) Patent No.: US 9,185,121 B2
(45) Date of Patent: Nov. 10, 2015

(54) DETECTING MALICIOUS CIRCUMVENTION OF VIRTUAL PRIVATE NETWORK

(71) Applicant: International Business Machines Corporation, Armonk, NY (US)

(72) Inventors: Suresh N. Chari, Tarrytown, NY (US); Josyula R. Rao, Briarcliff Manor, NY (US); Willliam J. Rippon, Putnam Valley, NY (US); Wilfried Teiken, Ossining, NY (US); Wietse Z. Venema, Amawalk, NY (US)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 14/145,010

(22) Filed: Dec. 31, 2013

(65) Prior Publication Data

US 2015/0188931 A1    Jul. 2, 2015

(51) Int. Cl.
*H04L 29/06*   (2006.01)
(52) U.S. Cl.
CPC ........ *H04L 63/1408* (2013.01); *H04L 63/0272* (2013.01)

(58) Field of Classification Search
CPC . H04L 63/0272; H04L 63/14; H04L 63/1408; H04L 63/1416; H04L 63/1425; H04L 63/1433; H04L 63/1441
See application file for complete search history.

(56) References Cited

U.S. PATENT DOCUMENTS

| 8,132,242 | B1 | 3/2012 | Wu | |
|---|---|---|---|---|
| 2004/0078592 | A1* | 4/2004 | Fagone et al. | 713/201 |
| 2005/0128989 | A1* | 6/2005 | Bhagwat et al. | 370/338 |
| 2008/0034418 | A1 | 2/2008 | Venkatraman et al. | |
| 2008/0301801 | A1 | 12/2008 | Jothimani | |

* cited by examiner

*Primary Examiner* — Yogesh Paliwal
(74) *Attorney, Agent, or Firm* — Yee & Associates, P.C.; Anne Dougherty

(57) ABSTRACT

An embodiment directed to a method is associated with a VPN that may be used to access resource servers. Upon determining that the VPN has been accessed by a specified client, resource servers are identified, which each has an address and may receive traffic routed from the client through the VPN. The method further comprises sending a message corresponding to each identified resource server to the client, wherein the message to corresponding to a given one of the identified resources is intended to cause a response to be sent from the client to the address of the given identified resource server. Responses to respective messages sent to the client are used to determine whether a route for traffic from the client to the VPN has been compromised.

18 Claims, 4 Drawing Sheets

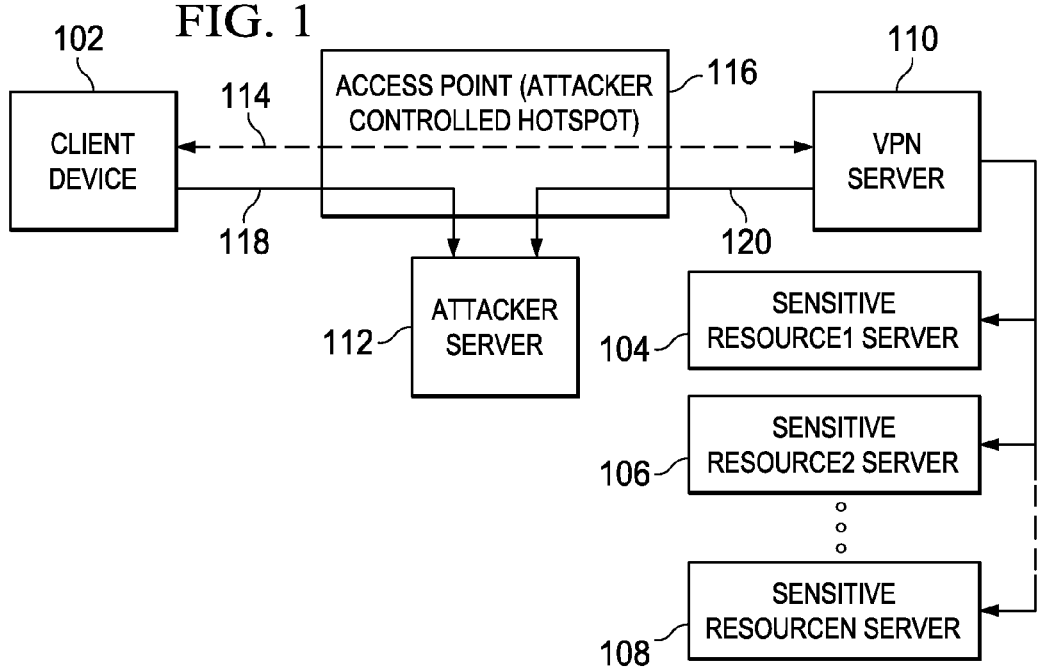
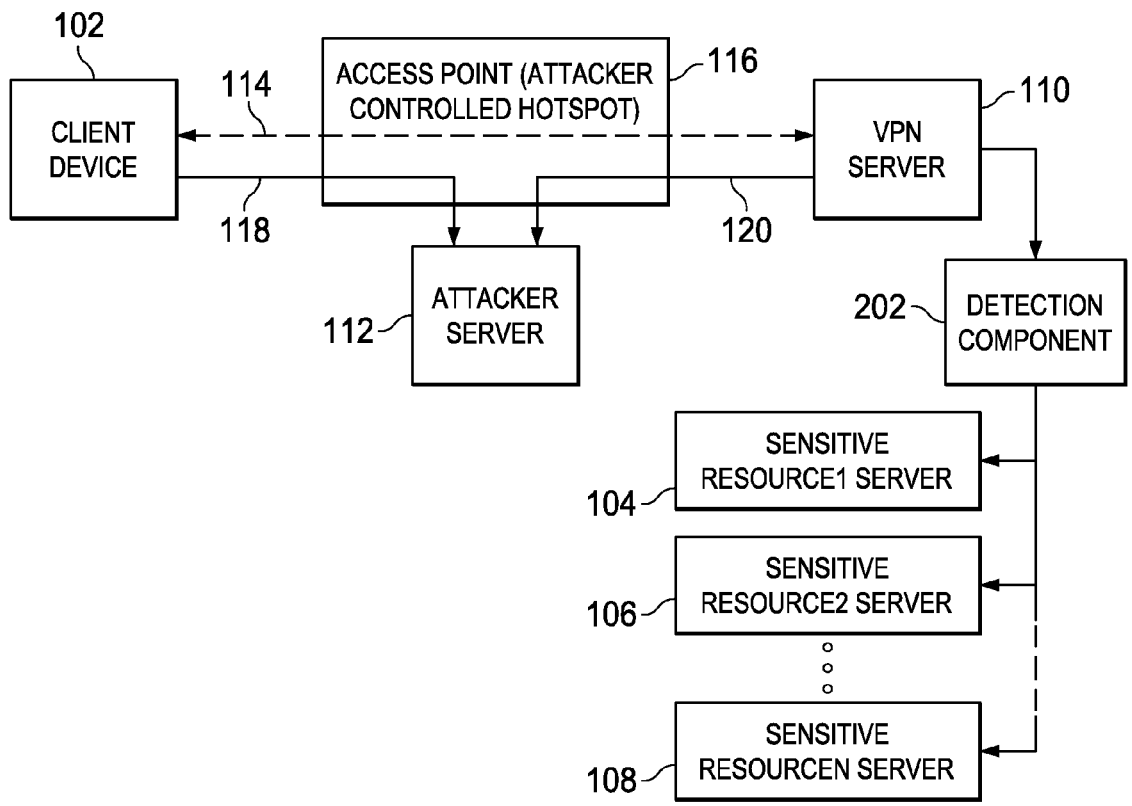

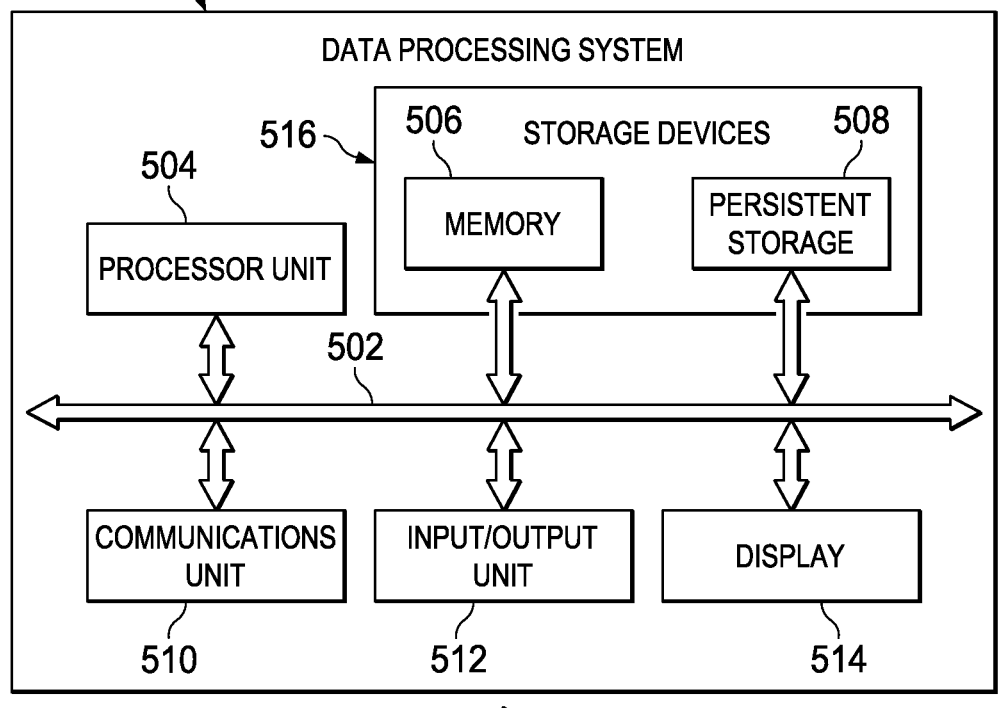
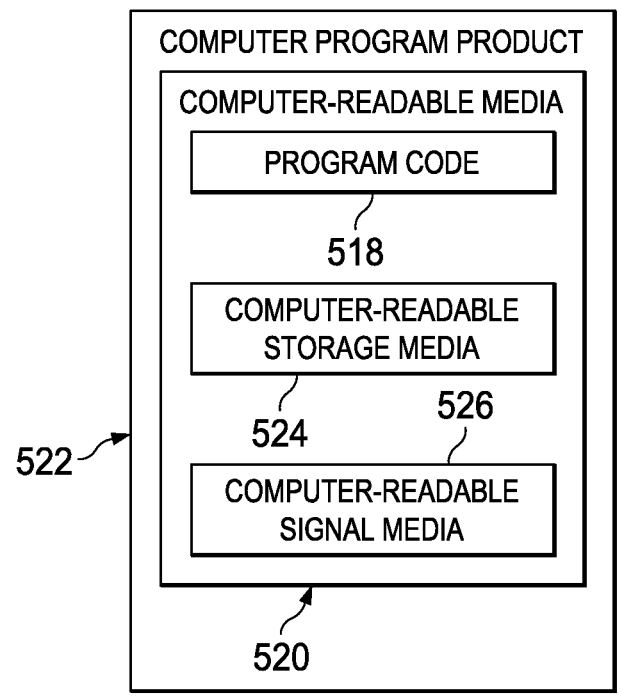
FIG. 5

DETECTING MALICIOUS CIRCUMVENTION OF VIRTUAL PRIVATE NETWORK

BACKGROUND

1. Field

The invention disclosed and claimed herein is generally directed to a method and system for detecting malicious or other unwanted circumvention of a virtual private network (VPN).

2. Description of the Related Art

In the current work environment employees of an enterprise or other organization often need to connect to vital enterprise resources while they are not in a traditional office environment. Instead, they may have to connect from home, from a hotel room, from a customer location, or from a mobile device while traveling, by way of example. As these resources are typically protected by firewall the access is often realized through the use of a virtual private network (VPN) that allows the employee to securely access the resources from his client device (e.g., laptop, tablet, phone, and the like). VPN, as is known by those of skill in the art, is a private network which is extended across a public network, such as the Internet. Thus, a client device can send and receive data across the public network, as though the client device was directly connected to the enterprise network.

Various authentication and encryption methods are used to control who can establish a VPN connection, and are also used to protect the data that is exchanged over the VPN connection. The VPN plays a role of protecting resources from external attacks, by adding an additional layer of defense that needs to be circumvented before the resources can be accessed. The VPN has a further role of protecting against wiretapping, as data is transferred to and from a client.

After establishing the VPN connection, the employee can often access all enterprise resources with connectivity similar to the connectivity available while in an enterprise location. This access is typically achieved by installing various "IP routes" on the client device that direct the traffic which is intended for an enterprise server through the VPN. Traffic for third parties which are not enterprise controlled servers (e.g. traffic to a publicly accessible information website) may either flow directly from the client device to the third party server, or may in certain configurations also be routed through the enterprise VPN servers.

A problem of existing technology is that it does not protect against maliciously created routes that may disrupt or intercept the intended traffic flow patterns. By using various technologies (e.g., additional routes or specifically crafted IP address assignments distributed by a malicious WiFi hotspot) an attacker can intercept and manipulate traffic that is intended to be sent to the enterprise using the VPN. If the attacker can gain access to another VPN account (e.g., through a malicious or careless insider) the obtained access can be used to intercept communication from a privileged user (e.g. a system administrator or high-level employee) without being noticed, such as by using VPN credentials obtained from an unprivileged enterprise account.

SUMMARY

Embodiments of the invention present an approach for detecting attempts to intercept VPN protected traffic, by analyzing IP response patterns in terms of used routes and timing. If discrepancies are detected in the response patterns, appropriate action can be taken like VPN connection termination, or sending alerts to the VPN user or system administrators.

Embodiments of the invention rely on enterprise resources only, instead of agents installed on a client machine. This is very significant, because agents of the client could be manipulated by an attacker. Also, some client platforms may allow agents that are not sufficient to check the client configuration. For example, iOS devices tend to severely limit the actions allowed for installed clients, and inspecting routing tables to detect misconfigurations may not be possible.

An embodiment directed to a computer implemented method is associated with a virtual private network (VPN) that may be used to access one or more resource servers. The method comprises the step of determining that a specified client has accessed the VPN. Responsive to determining that the VPN has been accessed by the specified client, one or more IP addresses are selected that can each be misused by an anomaly which is caused by manipulation of a routing table used by the specified client. The method further includes monitoring selected network traffic flowing to or from the specified client, wherein at least some of the traffic is associated with respective IP addresses, and is routed to or from the specified client through the VPN. Specified information is acquired from the monitored traffic and is used to determine whether a route for traffic from the specified client to the VPN has been compromised.

BRIEF DESCRIPTION OF THE SEVERAL VIEWS OF THE DRAWINGS

FIG. 1 is a schematic diagram that illustrates an attack scenario of a type that is addressed by embodiments of the invention.

FIG. 2 is a block diagram showing components used in implementing an embodiment of the invention.

FIG. 5 is a block diagram showing a computer or data processing system that may be used in implementing embodiments of the invention.

DETAILED DESCRIPTION

Figure 3:
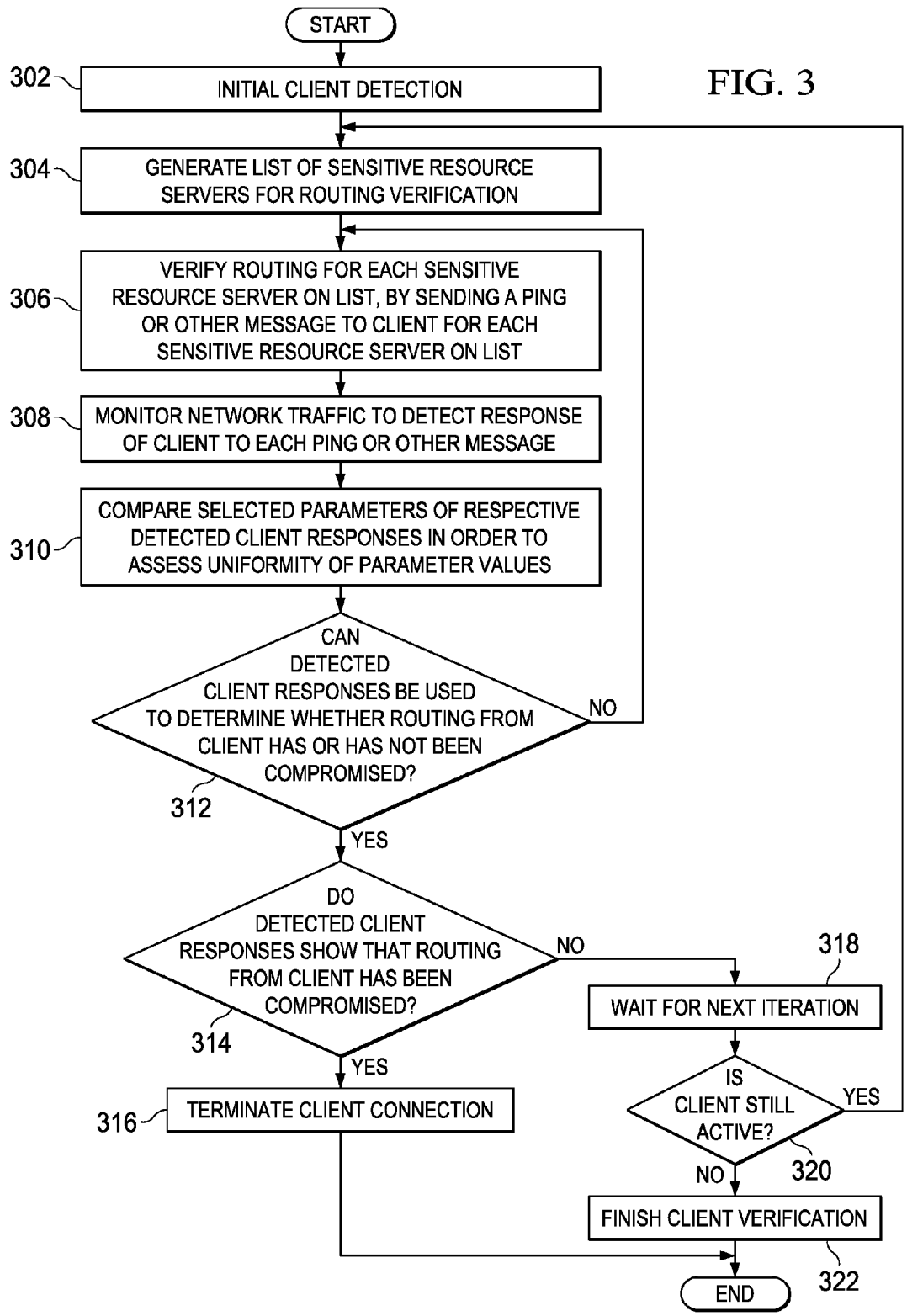
FIG. 3 is a flowchart showing steps of a method comprising an embodiment of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring to FIG. 1, there is shown a client device 102, which is operated by an employee or other user (not shown) who is associated with an organization such as a business enterprise or the like. The user intends to access remote servers of one or more sensitive resources 104-108 of the enterprise, by establishing a connection thereto through a virtual private network (VPN) server 110. Resources 104, 106, and 108 are also referenced in FIG. 1 as resources 1, 2, and N, respectively. Typically, the path between VPN server 110 and client device 110 has a fixed length, such as one hop, and a tunnel is created between the device and the VPN server. VPN 110 is associated with the enterprise, and as described above is a private network that uses a public network, such as the Internet or the like, to connect remote sites or users together.

At present, a very common approach for connecting client 102 to the VPN server 110 would be to use a WiFi hotspot or the like. A hotspot of this type offers Internet access over a wireless local area network (WLAN) through the use of a router which is connected to an Internet service provider. Hotspots are typically found in public establishments of many different types, including airports, train stations, libraries and coffee shops, but are not limited thereto. The router generally would be provided with a routing table that lists routes to particular network destinations.

FIG. 1 further illustrates an attack scenario, wherein an attempt is made by a malicious attacker (not shown) to circumvent or reroute traffic 114. More particularly, the attacker seeks to route traffic 114, which is intended to flow between client 102 and VPN server 110, to an attack server 112. The attacker may, for example, attempt to carry out a type of attack known as a "man in the middle" attack. In an attack of this type the attacker is able to intercept traffic flowing between first and second entities. As a first stage in such attack, a malicious attacker might establish an access point 116, comprising a hotspot as described above. This access point could be at or in the vicinity of an airport or other public facility where WiFi hotspots are typically located. However, the hotspot access point 116 would be controlled by the attacker. The hotspot could employ a machine of the attacker that masqueraded as a legitimate access point. Alternatively, the access point could be a legitimate access point that was being manipulated by the attacker.

In one possible approach, an attacker could carefully craft an IP address which was provided by access point 116 to client 102. For example, the address could appear to the client to be a local route to the IP address of a sensitive resource server. Then, traffic sent by client 102 to that address would actually be routed to the attacker server 112 instead of being sent through the VPN connection. The routing of that traffic would thus be severely compromised. The attacker may be able to intercept traffic sent to all of the sensitive resource servers, or only to a subset thereof. After intercepting the traffic, and copying and analyzing the traffic as needed, the attacker would forward the traffic to VPN server 110, perhaps using credentials copied from client 102 or using other VPN credentials obtained by the attacker.

Referring to FIG. 2, there is shown a detection component 202 placed into the configuration of components described above in connection with FIG. 1. More particularly, detector 202 is located in the path between VPN server 110 and respective sensitive resource servers 104-108. Detection component 202 is operable to implement steps of a method comprising an embodiment of the invention, as described hereinafter in connection with FIG. 3. This embodiment is able to detect attack scenarios such as described in connection with FIG. 1, and can be further used to verify that a traffic routing between client 102 and each of the sensitive resource servers has not been compromised. Herein, traffic routing is considered to be compromised, at least if traffic flows along a route which includes one or more non-legitimate nodes or malicious nodes. A non-legitimate node is at least a node that is unknown to the traffic sender, is unknown to an organization with which the sender is associated, and/or is unknown to each legitimate network service provider that provides some or all of the routing. However, embodiments of the invention are not limited to the above definition of routing being compromised.

In one embodiment of the invention detection component 202 could be implemented as a component of VPN server 110, as an additional executable running on the VPN server. Alternatively, detection component 202 could be implemented as a component in a central switch connected to the VPN server. In yet another embodiment, detection component 202 could be implemented as a standalone system connected to a monitor port on a central switch, as long as certain packets addressed to all sensitive resource servers are seen. The invention, however, is not limited to these embodiments.

Referring to FIG. 3, there are shown steps of a method comprising an embodiment of the invention, wherein some or all of the steps can be carried out by a device such as detection component 202. The method is provided to verify routing of traffic sent from a client to the VPN server, i.e., to ensure that this routing has not been compromised. The method commences at step 302, when connection of a new client 102 to VPN server 110 is initially detected. Usefully, the detection component 202 or other detector would be provided with event information from the VPN server, such as through real-time log files, and would detect the new client by continually monitoring the event information. Alternatively, the detector 202 could monitor network traffic and look for a connection made by a client to a sensitive resource server, wherein the client was not previously active.

At step 304, a list is generated of sensitive resource servers of the enterprise, wherein the routing taken by traffic from the new client to each sensitive resource server on the list needs to be verified. In one embodiment, the list would include all sensitive resource servers in the enterprise or organization. In other embodiments, the list could be a randomized subset of sensitive resource servers; a subset of sensitive resource servers with the most sensitive information; or a subset of sensitive resource servers that a user connecting the new client to the VPN is most likely to use. Detection component 202 may add specific addresses that are useful to gain coverage of the network address space intended to go from the client through the VPN server.

After generating the list of sensitive resource servers, step 306 is implemented to verify the routing for each server on the list, as described above. Generally, this is carried out by sending a ping or other message to the client, for each sensitive resource server on the list, wherein the ping or other message will cause the client to return a response. Accordingly, for each listed sensitive resource server, detection component 202 sends a ping or other message to a client that uses the IP address of that listed server. As a preliminary step, some pings may be sent with the IP address of the client, in order to establish a baseline for ping time variations.

In one embodiment of the invention, a ping is sent to the client wherein the ping has a unique identifier, such as a GUID, as its payload. As described above, the ping has the address of one of the listed sensitive resource servers, and the client should return a response to the ping to that address. The total time for the ping and the ping response, referred to as round trip time, will be detected by detection component 202.

In another embodiment, detection component 202 sends a message to a known service on the client, wherein the service will produce a response to the message. One such service could be a messaging function that listens for new messages. Alternatively, the detection component could send a message to the client to generate an error response. In yet in another embodiment, detection component 202 could have a ping or other message sent to the client from one of the sensitive resource servers on the list, or from the VPN server. It is thus seen that in these embodiments the client connection to the VPN is probed starting from the network server side, and not the client side.

After respective pings or other messages are sent to the client, detection component 202 monitors network traffic to detect the client response to each ping message, or message of other type. This detection is carried out at step 308 of the method of FIG. 3. At this step selected parameters of the client responses are also measured. After client responses to all the pings of sensitive resource servers on the list have been detected, the method proceeds to step 310. This step compares the selected parameters of respective client responses to one another, in order to assess the uniformity of parameter values.

For steps 308 and 310, useful parameters to be measured and compared include the client response time, the time to live (TTL) of each client response packet, and particular client responses that are found to be missing or were never received. Generally, for a network that is secure or free from compromise, comparison step 310 should find that measured TTL values are uniform, that is, are substantially the same, for the client response detected for each sensitive resource server on the list of step 304. Thus, if it is found that the TTL parameter values computed for respective client responses are distributed over a range that exceeds a prespecified limit, it may be readily determined that client traffic routing has been compromised.

Similarly, a significant distribution of client response times can also indicate that the routing is compromised. If the timing is found to vary, this may indicate that additional processing steps, which are involved in traffic interception, are being carried out. In a useful embodiment, it is determined that the routing has been compromised, if the difference between the value for a given message response and an average response time value for responses associated with the client-VPN connection exceeds a prespecified differential.

Moreover, if the client response associated with a given sensitive resource server is not detected or is not received, there is a strong or compelling inference that traffic routing from the client to the given sensitive resource server has been compromised. A further basis for concluding that the routing has been compromised is determining that the source address, of the response to a ping or other message from a sensitive resource server, does not match the address of the client, or other address to which the ping or other message was sent.

In embodiments of the invention, it has been recognized that the results of step 310, for a given set of detected client responses, may not be usable for determining whether or not client traffic routing has been compromised. This situation, for example, could be caused by a packet being lost, or by a distribution of response times that seems high, but not high enough to be certain that routing has been compromised. Accordingly, the method of FIG. 3 is provided with a decision step 312 to deal with this situation. If it is determined at step 312 that the previously detected client responses cannot be used to determine whether routing has been compromised, the method returns to the input of step 306. Another effort is then made to verify the routing for the sensitive resource servers on the previous list of step 304.

If the results of decision step 312 are positive, the method of FIG. 3 proceeds to decision step 314. This step determines from the detected client responses and the results of step 310 whether the client routing has been compromised. If the determination of step 314 is affirmative, the method goes to step 316, which terminates the client connection to the VPN. The detection component 202 could, for example, notify the VPN server to terminate the client connection, or could send a network message to the client that causes the client to terminate the connection.

In an alternate embodiment the detection component 202 can notify the device user or an administrator of the compromised VPN connection to allow them to handle the situation appropriately.

If it is determined at step 314 that the routing has not been compromised, the method proceeds to step 318. This step waits for another iteration of routing verification to take place. By providing step 318, the method of FIG. 3 periodically verifies the routing of the particular client detected at step 302. The time until the next iteration, comprising the wait time, could be preselected, or could depend on the level of confidence of the detection component in the previous determination that the routing was not compromised. In some embodiments, wait times could be on the order of days or on the order of weeks.

Following the wait time, the method of FIG. 3 determines whether the client is still active at decision step 320. If not, client verification is finished at step 322, and the method ends. Otherwise, the method proceeds to the input of step 304. A new list of sensitive resource servers is then generated, for another routing verification for the client. The above verification method thus continues, periodically, until a routing compromise is detected, or the client becomes inactive.

In a further embodiment, the detection component also receives information about users that are used to authorize access to the sensitive resource servers and the VPN addresses used for these accesses. The detection component will determine if there are any anomalies in the correlation between users and VPN connections. If several users are used in authorizing access to the sensitive resource servers for traffic that all originates from one VPN connection, the detection component may terminate the client connection. Equally, if one user ID is used to authorize access to several sensitive resource servers, but several VPN connection are involved in these connections from a client to the sensitive resource servers, the client connections may likewise be terminated.

Figure 4:
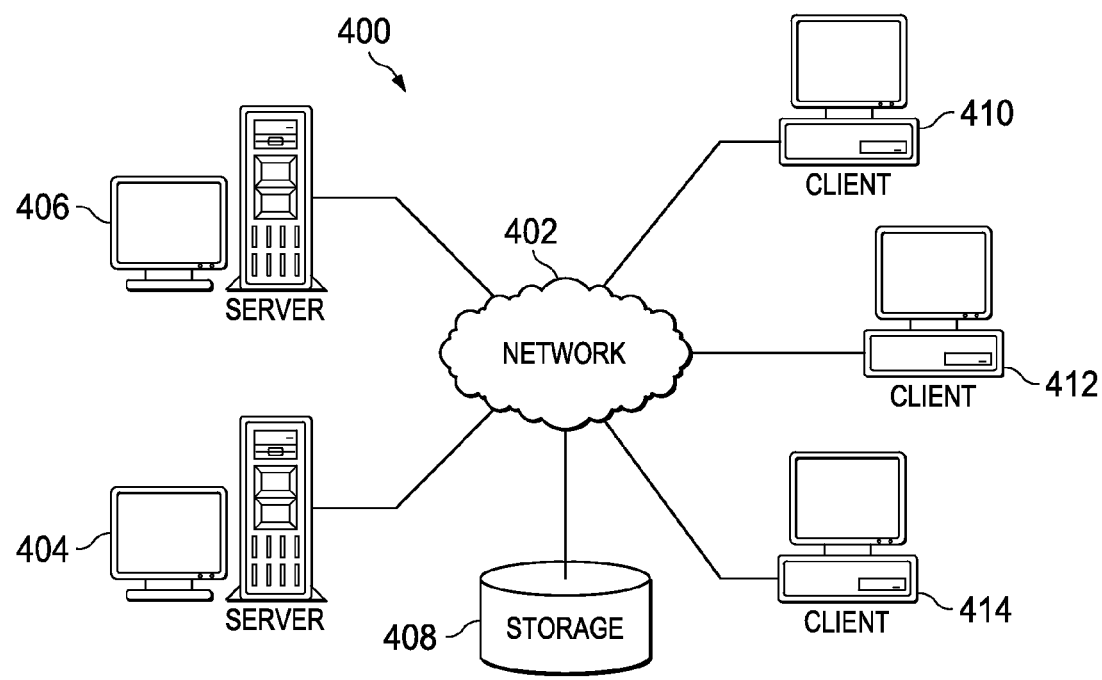
FIG. 4 is a block diagram showing a network of data processing systems in which an embodiment of the invention may be implemented.

FIG. 4 is a pictorial representation of a network of data processing systems in which illustrative embodiments of the invention may be implemented. Network data processing system 400 is a network of computers in which the illustrative embodiments may be implemented. Network data processing system 400 contains network 402, which is the medium used to provide communications links between various devices and computers connected together within network data processing system 400. Network 402 may include connections, such as wire, wireless communication links, or fiber optic cables.

In the depicted example, server computer 404 and server computer 406 connect to network 402 along with storage unit 408. In addition, client computers 410, 412, and 414 connect to network 402. Client computers 410, 412, and 414 may be, for example, personal computers or network computers. In the depicted example, server computer 404 provides information, such as boot files, operating system images, and applications to client computers 410, 412, and 414. Client computers 410, 412, and 414 are clients to server computer 404 in this example. Network data processing system 400 may include additional server computers, client computers, and other devices not shown.

Program code located in network data processing system 400 may be stored on a computer-recordable storage medium and downloaded to a data processing system or other device for use. For example, program code may be stored on a computer-recordable storage medium on server computer 404 and downloaded to client computer 410 over network 402 for use on client computer 410.

In the depicted example, network data processing system 400 is the Internet with network 402 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational and other computer systems that route data and messages. Of course, network data processing system 400 also may be implemented as a number of different types of networks, such as, for example, an intranet, a local area network (LAN), or a wide area network (WAN). FIG. 4 is intended as an example, and not as an architectural limitation for the different illustrative embodiments.

Turning now to FIG. 5, an illustration of a data processing system is depicted in accordance with an illustrative embodiment. In this illustrative example, data processing system 500 includes communications fabric 502, which provides communications between processor unit 504, memory 506, persistent storage 508, communications unit 510, input/output (I/O) unit 512, and display 514.

Processor unit 504 serves to process instructions for software that may be loaded into memory 506. Processor unit 504 may be a number of processors, a multi-processor core, or some other type of processor, depending on the particular implementation. "A number," as used herein with reference to an item, means one or more items. Further, processor unit 504 may be implemented using a number of heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information, such as, for example, without limitation, data, program code in functional form, and/or other suitable information either on a temporary basis and/or a permanent basis. Storage devices 516 may also be referred to as computer readable storage devices in these examples. Memory 506, in these examples, may be, for example, a random access memory or any other suitable volatile or non-volatile storage device. Persistent storage 508 may take various forms, depending on the particular implementation.

For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output unit 512 allows for input and output of data with other devices that may be connected to data processing system 500. For example, input/output unit 512 may provide a connection for user input through a keyboard, a mouse, and/or some other suitable input device. Further, input/output unit 512 may send output to a printer. Display 514 provides a mechanism to display information to a user.

Instructions for the operating system, applications, and/or programs may be located in storage devices 516, which are in communication with processor unit 504 through communications fabric 502. In these illustrative examples, the instructions are in a functional form on persistent storage 508. These instructions may be loaded into memory 506 for processing by processor unit 504. The processes of the different embodiments may be performed by processor unit 504 using computer-implemented instructions, which may be located in a memory, such as memory 506.

These instructions are referred to as program code, computer usable program code, or computer readable program code that may be read and processed by a processor in processor unit 504. The program code in the different embodiments may be embodied on different physical or computer readable storage media, such as memory 506 or persistent storage 508.

Program code 518 is located in a functional form on computer readable media 520 that is selectively removable and may be loaded onto or transferred to data processing system 500 for processing by processor unit 504. Program code 518 and computer readable media 520 form computer program product 522 in these examples. In one example, computer readable media 520 may be computer readable storage media 524 or computer readable signal media 526.

Computer readable storage media 524 may include, for example, an optical or magnetic disk that is inserted or placed into a drive or other device that is part of persistent storage 508 for transfer onto a storage device, such as a hard drive, that is part of persistent storage 508. Computer readable storage media 524 also may take the form of a persistent storage, such as a hard drive, a thumb drive, or a flash memory, that is connected to data processing system 500.

In some instances, computer readable storage media 524 may not be removable from data processing system 500. In these examples, computer readable storage media 524 is a physical or tangible storage device used to store program code 518 rather than a medium that propagates or transmits program code 518. Computer readable storage media 524 is also referred to as a computer readable tangible storage device or a computer readable physical storage device. In other words, computer readable storage media 524 is media that can be touched by a person.

Alternatively, program code 518 may be transferred to data processing system 500 using computer readable signal media 526. Computer readable signal media 526 may be, for example, a propagated data signal containing program code 518. For example, computer readable signal media 526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 518 may be downloaded over a network to persistent storage 508 from another device or data processing system through computer readable signal media 526 for use within data processing system 500. For instance, program code stored in a computer readable storage medium in a server data processing system may be downloaded over a network from the server to data processing system 500. The data processing system providing program code 518 may be a server computer, a client computer, a remote data processing system, or some other device capable of storing and transmitting program code 518. For example, program code stored in the computer readable storage medium in data processing system 500 may be downloaded over a network from the remote data processing system to the computer readable storage medium in data processing system 500. Additionally, program code stored in the computer readable storage medium in the server computer may be downloaded over the network from the server computer to a computer readable storage medium in the remote data processing system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. In association with a virtual private network (VPN) that may be used to access one or more resource servers, a computer implemented method comprising:
   determining that a specified client has accessed the VPN;
   responsive to determining that the VPN has been accessed by the specified client, selecting one or more IP addresses that can each be misused by an anomaly resulting from manipulation of a routing table used by the specified client;
   monitoring messages and responses comprising selected network traffic flowing to or from the specified client, wherein at least some of the traffic is associated with respective IP addresses, and is routed to or from the specified client through the VPN;

acquiring specified information from monitored traffic;

using the specified information acquired to determine whether a routing for traffic from the specified client to the VPN has been compromised; and responsive to a determination that the routing has not been compromised and after a predetermined wait time, identifying a new set of IP addresses, and monitoring the selected network traffic flowing to or from the specified client, wherein at least some of the traffic is associated with respective IP addresses, and is routed to or from the specified client through the VPN.

2. The method of claim 1, wherein:

each of one or more identified resource servers has an address comprising one of the IP addresses, and a message corresponding to each identified resource server is sent to the specified client, wherein the message corresponding to a given one of the identified resource servers is intended to cause a response to be sent from the specified client to the address of the given one of the identified resource servers, and respective messages, and responses thereto, comprise selected network traffic.

3. The method of claim 2, wherein:

each of the respective messages sent to the specified client comprises a ping packet.

4. The method of claim 2, wherein:

each of the respective messages sent to the specified client comprises a message sent to a service on the specified client that produces a response of specified type.

5. The method of claim 1, wherein:

the responses to respective messages in the monitored network traffic provide one or more parameters selected from a group of parameters that includes at least response time, time to live (TTL) of a response, and information indicating whether a response was or was not received for a message corresponding to one of the identified IP addresses.

6. The method of claim 1, wherein:

the monitored traffic provides selected parameters, and for at least one of the selected parameters, a value of a parameter is computed for each response, and it is determined that the routing has been compromised if values of the parameter computed for respective responses are distributed over a range that exceeds a prespecified limit.

7. The method of claim 1, wherein:

the messages and responses in the monitored traffic provide a selected parameter comprising response time, and it is determined that the routing has been compromised if a difference between a value of the response time for a given message response, and an average response time value for responses associated with the VPN, exceeds a prespecified differential.

8. The method of claim 1, wherein:

it is determined that the routing has been compromised, if a response is not received from the specified client for a message sent to the specified client from one or more of the identified resource servers.

9. The method of claim 1, wherein:

it is determined that the routing has been compromised if a source address of a response to a particular message does not match the address of the specified client, or other address to which the particular message was sent by one or more identified resource servers, selectively.

10. The method of claim 1, wherein:

responsive to determining that the routing has been compromised, a connection of the specified client to the VPN is terminated, or a notification is sent to a user of the specified client or to an administrator of a VPN connection, selectively.

11. The method of claim 1, wherein:

a detection component located between the VPN and respective resource servers is operable to send respective messages to the specified client, and to detect responses to the messages.

12. The method of claim 1, wherein:

at periodic intervals, a new set of IP addresses is identified, and monitoring selected network traffic flowing to or from the specified client, wherein at least some of the traffic is associated with respective IP addresses, and is routed to or from the specified client through the VPN, until the client becomes inactive or it is determined that the routing has been compromised.

13. The method of claim 1, wherein:

responsive to determining that the selected network traffic monitored provides a specified level of uncertainty, in regard to whether the routing has been compromised, a specific message corresponding to each identified IP address is sent to the specified client.

14. In association with a virtual private network (VPN) that may be used to access one or more resource servers, a computer program product comprising a non-transitory computer readable storage medium having program instructions embodied therewith for execution by a computer, the program instructions further comprising:

instructions for determining that a specified client has accessed the VPN;

instructions responsive to determining that the VPN has been accessed by the specified client for identifying one or more resource servers, wherein each identified resource server has an address, and enables access to receive computer traffic routed from the specified client through the VPN;

instructions for sending a message corresponding to each identified resource server to the specified client, wherein the message corresponding to a given one of the identified resource servers is intended to cause a response to be sent from the specified client to the address of the given one of the identified resource servers;

instructions for using the responses to respective messages sent to the specified client to determine whether a routing for traffic from the specified client to the VPN has been compromised; and instructions responsive to determining that the routing has not been compromised and after a predetermined wait time, for identifying a new set of resource servers and sending a message corresponding to each resource server in the new set to the specified client.

15. The computer program product of claim 14, wherein:

the responses to respective messages provide one or more parameters selected from a group of parameters that includes at least response time, time to line (TTL) of a response, and information indicating whether a response was or was not received for each message corresponding to one of the identified resource servers.

16. The computer program product of claim 15, wherein:

for at least one of the parameters selected, a value of a parameter is computed for each response, and it is determined that the routing has been compromised if values of the parameter computed for respective responses are distributed over a range that exceeds a prespecified limit.

17. The computer program product of claim 14, wherein:
it is determined that the routing has been compromised if a response is not received from the specified client, for a message sent to the specified client from one of the identified resource servers.

18. In association with a virtual private network (VPN) that may be used to access one or more resource servers, a computer system comprising:
  a bus;
  a memory connected to the bus, wherein program code is stored on the memory; and,
  a processor unit connected to the bus, wherein the processor unit executes the program code:
    to determine that a specified client has accessed the VPN;
    responsive to determining that the VPN has been accessed by the specified client, to identify one or more resource servers, wherein each identified resource server has an address, and enables access to receive computer traffic routed from the specified client through the VPN;
    to send a message corresponding to each identified resource server to the specified client, wherein the message corresponding to a given one of the identified resource servers is intended to cause a response to be sent from the specified client to the address of the given one of the identified resource servers;
    to use the responses to respective messages sent to the specified client to determine whether a routing for traffic from the specified client to the VPN has been compromised; and
    responsive to determining that the routing has not been compromised and after a predetermined wait time, to identify a new set of resource servers, and to send a message corresponding to each resource server in the new set to the specified client.

* * * * *